(12) United States Patent
Dominguez De Walter et al.

(10) Patent No.: US 6,787,630 B1
(45) Date of Patent: Sep. 7, 2004

(54) PROCESS FOR THE PREPARATION OF HEAT-STABLE, ANTIMONY-FREE POLYESTERS OF NEUTRAL COLOR AND THE PRODUCTS WHICH CAN BE PREPARED BY THIS PROCESS

(75) Inventors: Ligia Dominguez De Walter, Frankfurt (DE); Banks Bryan Moore, Spartanburg, SC (US); Peter Klein, Wiesbaden (DE)

(73) Assignee: Arteva North America S.A.R.L., Zurich (CH)

( * ) Notice: Subject to any disclaimer, the term of this patent is extended or adjusted under 35 U.S.C. 154(b) by 0 days.

(21) Appl. No.: 08/520,662

(22) Filed: Aug. 28, 1995

(30) Foreign Application Priority Data

Aug. 29, 1994 (DE) .......................................... 44 30 634

(51) Int. Cl.⁷ .............................................. C08G 63/82
(52) U.S. Cl. ....................... 528/279; 528/280; 528/301; 528/302; 528/307; 528/308; 528/308.6; 528/286; 524/81
(58) Field of Search ................................. 528/279, 280, 528/286, 301, 302, 307, 308, 308.6; 524/81

(56) References Cited

U.S. PATENT DOCUMENTS

| | | | |
|---|---|---|---|
| 3,962,189 A | | 6/1976 | Russin et al. ................ 528/277 |
| 4,131,601 A | * | 12/1978 | Hashimoto et al. .......... 528/279 |
| 4,208,527 A | * | 6/1980 | Horlbeck et al. ............. 528/279 |
| 4,921,019 A | | 5/1990 | Kawabata et al. ........... 139/452 |
| 4,983,711 A | | 1/1991 | Sublett et al. ............... 528/272 |
| 5,340,907 A | * | 8/1994 | Yau et al. .................... 528/274 |

FOREIGN PATENT DOCUMENTS

| | | |
|---|---|---|
| FR | A-2419949 | 10/1979 |
| JP | 51-123311 | 10/1976 |
| JP | 53-28006 | 3/1978 |
| JP | 55-111985 | 8/1980 |

OTHER PUBLICATIONS

Chemical Abstracts, vol. 87, No. 16, Oct. 17, 1977, Columbus, Ohio; abstract No. 118407n, Kiyoshi Nawata, "Polyester manufacture", seite 25; Zusammenfassung, & JP-A-52 062 398 (Teijin, Ltd.), May 23, 1977.

* cited by examiner

Primary Examiner—Samuel A. Acquah
(74) Attorney, Agent, or Firm—Gregory N. Clements

(57) ABSTRACT

Process for the preparation of heat-stable, antimony-free polyesters of neutral color and the products which can be prepared by this process A process for the preparation of heat-stable, antimony-free polyesters of neutral color by esterification of aromatic dicarboxylic acids or transesterification of lower aliphatic esters of aromatic dicarboxylic acids with aliphatic diols and subsequent polycondensation in which a possible transesterification is carried out in the presence of 20 to 120 ppm, based on the catalyst metal, of a transesterification catalyst, after the esterification or transesterification has ended, phosphoric acid, phosphorous acid and/or phosphonic acids or a derivative thereof are added to the esterification or transesterification batch as a completing agent in an amount which is 100% of the amount equivalent to the transesterification catalyst employed and up to 99% of the amount equivalent to the cobalt to be employed, up to 80 ppm of cobalt in the form of a cobalt compound are then added to the batch, and the polycondensation is carried out without the addition of antimony, in the presence of 1 to 10 ppm of titanium, which is added in the form of a titanium compound, and if appropriate in the presence of up to 1000 ppm of organic compounds which donate crosslinking structural groups (pentaerythritol) and if appropriate up to 50 ppm of an optical brightener, is described.

The polyester obtainable by this process is furthermore described.

22 Claims, 1 Drawing Sheet

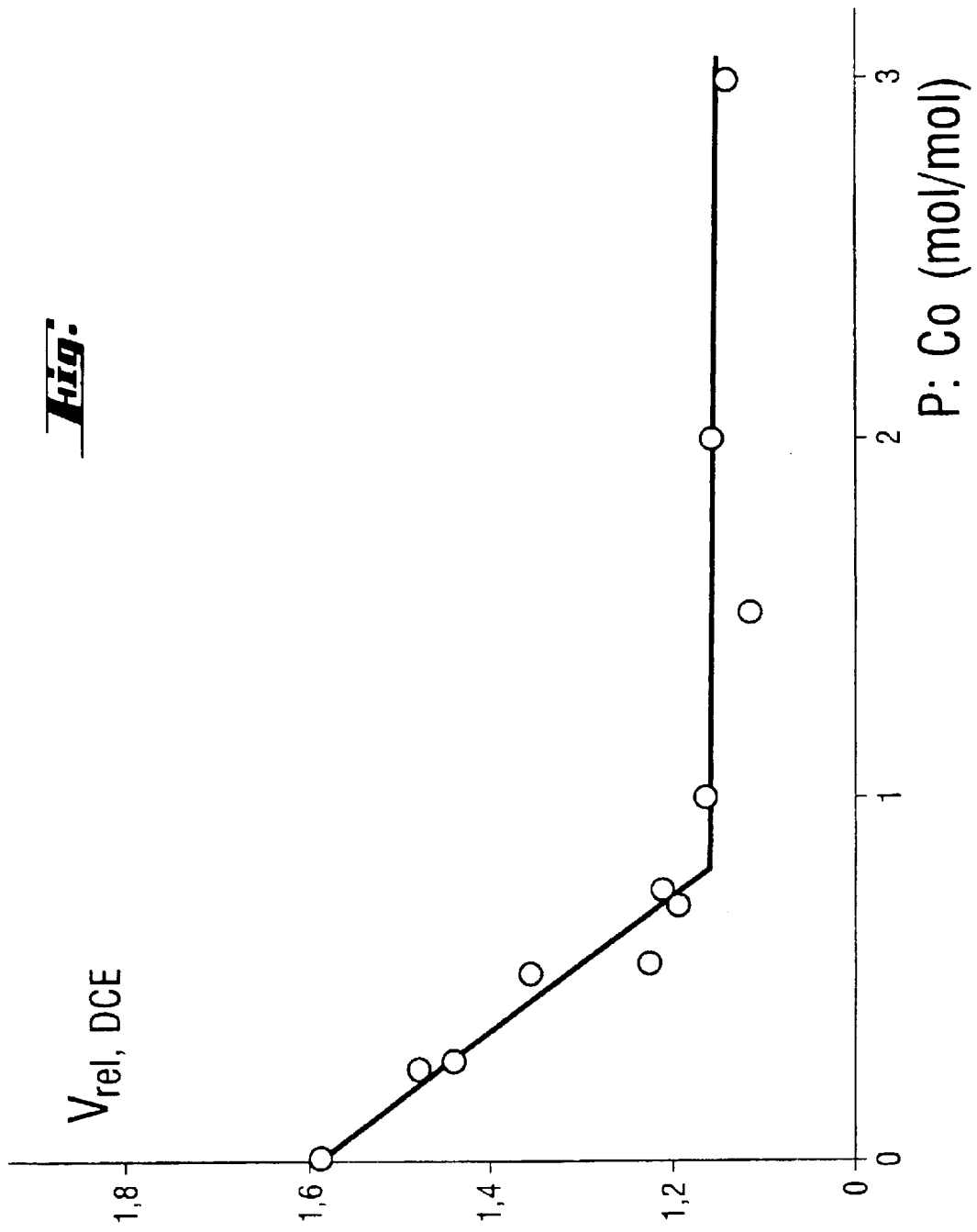

PROCESS FOR THE PREPARATION OF HEAT-STABLE, ANTIMONY-FREE POLYESTERS OF NEUTRAL COLOR AND THE PRODUCTS WHICH CAN BE PREPARED BY THIS PROCESS

The present invention relates to a process for the preparation of heat-stable, antimony-free polyesters of neutral color using a titanium polycondensation catalyst, which is very easily reproducible and has a very high rate of polycondensation, even with very small additions of the titanium polycondensation catalyst, and in which a considerable reduction in thermal degradation and uncontrolled crosslinking of the polyester formed results, and to the products which can be prepared by this process, which are distinguished by outstanding clarity and color neutrality.

Polyesters have acquired very great importance in very many fields of use. In particular, saturated polyesters are widely used for the production of fiber materials, and also of other types of shaped articles, such as, for example, drinks bottles. For problem-free processability of these polyesters by extrusion processes and for the further use of the extrudates, for example in the textile industry or drinks industry, very high requirements are imposed on the quality of the polyesters. In particular, it is required that the processing and use properties of polyester types employed for a particular processing operation are always the same within very narrow limits. For processing by extrusion processes, for example by melt spinning, it is of prime importance that they have a constantly uniform molecular weight and a constantly reproducible molecular weight distribution, are free from gel fractions and as far as possible do not tend toward yellowing or toward thermal degradation. For further processing, as far as possible no catalyst metals should dissolve out of the fiber material during dyeing processes, since these must be removed from the dyehouse waste water and disposed of by expensive purification operations.

There should also be no difficulties caused by troublesome constituents in the disposal or re-use (recycling) of the used polyester products.

Polyesters are usually prepared by esterification of aromatic dicarboxylic acids or transesterification of lower aliphatic esters of aromatic dicarboxylic acids with aliphatic diols and subsequent polycondensation until the molecular weight required for the planned use is achieved.

A possible transesterification is carried out in the presence of transesterification catalysts which, after the transesterification has ended, must be deactivated by addition of complexing agents. Complexing agents which are usually employed are phosphoric acid, phosphorous acid and/or phosphonic acids or derivatives thereof. After the esterification or the transesterification, the polycondensation is carried out to give the desired molecular weight, this also being carried out in the presence of a suitable catalyst. Antimony compounds, usually antimony trioxide, have become accepted as the polycondensation catalyst on a large industrial scale. Some of the antimony compound here may be reduced to antimony metal by reducing agents, which leads to a graying of the polyester.

This results in a lack of clarity and a non-neutral color shade.

Furthermore, the relatively high content of antimony compounds in the polyesters is regarded as a disadvantage since it makes the preparation more expensive. In addition, th re is the possibility of antimony compounds being liberated during further processing operations, for example during dyeing. The relatively high content of antimony compounds leads to an influence on spinning properties, in addition to the formation of antimony deposits.

Proposals have therefore already been made to eliminate the disadvantages of the preparation process described.

It is thus known to improve the color shade of the polyesters by addition of cobalt compounds and/or optical brighteners. It is furthermore known to employ titanium compounds, instead of antimony compounds, as the polycondensation catalyst.

Various publications, for example U.S. Pat. No. 3,962,189, JP-PS-28006 (1979), JP-PS-123311 (1976), JP-PS-43564 (1979), JP-PS-111985 (1980) or JP-PS-280048 (1989), disclose a process for the preparation of polyesters in which, in order to improve the color shade of the polyester, a cobalt compound which—like the transesterification catalyst—must be complexed before the start of the polycondensation is added, and in which the polycondensation is carried out in the presence of a titanium compound.

According to these publications, the amount of complexing agent employed for complexing the added cobalt is said to be in the range from 0.5 to 7.5 mol per mole of cobalt compound.

The P/Co ratio used is thus 0.5 to 1.5 in JP Patent 28006, 0.7 to 3 in JP Patent 111985 and 0.5 to 7.5 [mol/mol] in JP Patent 280048.

This known process has the considerable advantage that all the disadvantages associated with the use of antimony compounds are eliminated and that it can thus actually be possible to produce clear polyesters of neutral color which are suitable for demanding processing operations and uses.

However, a disadvantage of this known process is that its reproducibility leaves something to be desired. Thus, occasionally the desired products are not obtained, but instead disturbances occur in the polycondensation reaction, the molecular weights required are not reached, and if it is considered necessary to prolong the polycondensation time, then yellowing of the polyester, the formation of gel fractions owing to uncontrolled crosslinking and heat sensitivity of the products occur, considerably impairing further processing.

The advantages which the process offers per se therefore cannot always be realized.

It has now been found that it is possible, surprisingly, to prepare heat-stable, antimony-free polyesters of neutral color in a manner which is always reproducible by esterification of aromatic dicarboxylic acids or transesterification of lower aliphatic esters of aromatic dicarboxylic acids with aliphatic diols and subsequent polycondensation, if a possible transesterification is carried out in the presence of 20 to 120 ppm, based on the catalyst metal, of a transesterification catalyst, preferably manganese in the form of a manganese compound, then, after the esterification or transesterification has ended, phosphoric acid, phosphorous acid and/or phosphonic acids or a derivative thereof are added to the esterification or transesterification batch as a complexing agent in an amount which is 100% of the amount equivalent to the transesterification catalyst employed and up to 99% of the amount equivalent to the cobalt to be employed, 0 to 80 ppm of cobalt in the form of a cobalt compound are added to the batch, and the polycondensation is carried out without the addition of antimony, in the presence of 1 to 10 ppm of titanium, which is added in the form of a titanium compound, and if appropriate in the presence of up to 1000 ppm of organic compounds which donate crosslinking structural groups and if appropriate up to 50 ppm of an optical brightener.

Suitable transesterification catalysts are known from the literature. For example, compounds of metals of groups Ia (for example Li, Na, K), IIa (for example Mg, Ca) and VIIa (for example Mn) of the Periodic Table, in particular those which have a certain solubility in the transesterification batch, such as, for example, salts of organic acids, are suitable for the process according to the invention. Preferred compounds are salts of group VIIa, in particular of manganese, with lower aliphatic carboxylic acids, in particular acetic acid.

A preferred embodiment of the process according to the invention therefore comprises carrying out a possible transesterification in the presence of 20 to 120 ppm of manganese (calculated as the metal) in the form of a manganese compound, in particular manganese acetate.

The cobalt compound added to improve the color shade of the polyester is expediently likewise a salt of cobalt with an organic acid, for example with acetic acid or adipic acid.

The minimum amount of cobalt compound depends on the extent of the color shift necessary in an individual case to achieve a neutral color shade. If optical brighteners are additionally employed for color correction, the amount of cobalt compound can of course be reduced.

As a rule, the amount of added cobalt required, as stated above, is not more than 50 ppm (calculated as the metal), always based on the weight of the polyester.

Preferably, 20 to 40 ppm of cobalt are added to the mixture in the form of a cobalt compound, i.e. an amount of cobalt compound is added which corresponds to an amount of 20 to 40 ppm of free cobalt.

As in conventional processes, the transesterification catalyst is inactivated by addition of a complexing agent before the start of the polycondensation in the process according to the invention, because otherwise the polycondensation is impeded, i.e. the required high molecular weights of the polyesters cannot be achieved, and furthermore the resulting polyester has an increased sensitivity to exposure to heat. In isolated cases, the cobalt compounds added before the polycondensation have also been complexed in order to improve the heat stability of the polyesters prepared.

For the process according to the invention, it is thus essential that under no circumstances should the total amount of cobalt compound added be inactivated, but that 1 to 10% of the cobalt compound added remains non-complexed.

The amount of complexing agent is therefore chosen such that the transesterification catalyst is deactivated 100% by complexing, but that only 90 to 99% of the cobalt compound is complexed.

If the complexing power of a complexing agent is known precisely, 90 to 99% of the amount of complexing agent equivalent to the amount of cobalt can easily be employed. As a rule, however, it is more expedient to determine the amount of complexing agent required by preliminary experiments. For this, for example, about 80% to 120% of the theoretically required amount of complexing agent is added to a few test batches of the polycondensation batch, which all have the same composition as a planned main batch, and polycondensation is then carried out under the same conditions.

After the polycondensation reaction has ended, the viscosity achieved (i.e. the molecular weight achieved) is determined in all the batches.

The results of such a series of preliminary experiments are shown in the figure. In this, the viscosities reached are plotted against the ratio of complexing agent to cobalt compound (for example the P/Co ratio) in a system of coordinates.

It can be seen that if the P/Co ratio is too high, only low viscosities, i.e. low molecular weights, can be reached. Below a certain limit of the P/Co ratio, the molecular weights achieved rise.

The transition point between the flat and the ascending branch of the curve marks the equivalent P/Co ratio.

Up to 99% of the amount of complexing agent thus determined is then added to the main batch.

It is particularly advantageous if, after the esterification or transesterification has ended, phosphoric acid, phosphorous acid and/or phosphonic acids or a derivative thereof is added to the esterification or transesterification batch as a complexing agent in an amount of 100% of the amount equivalent to the transesterification catalyst employed and 90 to 99% of the amount equivalent to the cobalt to be employed.

The measure of only partly deactivating the cobalt compounds added surprisingly leads to a drastic improvement in the reproducibility of the process, resulting in a very high rate of polycondensation, even with very small additions of the titanium polycondensation catalyst, and a considerable reduction in the thermal degradation and uncontrolled crosslinking of the polyester formed, with the consequence that no yellowing and no gel formation occur. Therefore, in the reaction procedure according to the invention, fewer esthetic additives are also required, and problem-free processability is achieved. The resulting polyesters meet the highest quality requirements in respect of clarity and color neutrality.

Suitable complexing agents for the process according to the invention are in principle all compounds which are known as complexing agents and inactivators for transesterification catalysts. Phosphorus-containing compounds, such as, for example, phosphoric acid, polyphosphoric acid, phosphorous acid and phosphonic acids and derivatives thereof, have proved to be particularly suitable. Specific examples of phosphoric acid derivatives are the "PHM esters", that is to say mixtures of oxyalkylated alkyl-hydroxyalkyl-phosphoric acid esters of the formula I or phosphonic acid esters of the formula II

$$O\!=\!P(OR^1)_3 \tag{I}$$

$$(R^2O)_2\!-\!PO\!-\!R^3\!-\!COOR^4 \tag{II}$$

in which the radicals $R^1$ and which $R^2$, $R^3$ and $R^4$ are alkyl radicals identical or different alkyl, hydroxyalkyl or alkoxylated hydroxyalkyl radicals.

Titanium compounds are employed as the polycondensation catalyst in the process according to the invention. All titanium compounds which have already been described for this purpose, in particular potassium titanyloxalate or titanium isopropylate, are suitable in principle.

It is particularly preferable to carry out the polycondensation without addition of antimony in the presence of 1 to 10 ppm of titanium up to an IV, measured in dichloroacetic acid at 25° C., of 0.4 to 0.9 dl/g, preferably 0.5 to 0.7 dl/g, and up to a carboxyl group concentration of 10 to 50 mmol/kg, preferably 10 to 40 mmol/kg, in the melt, and subsequently up to the desired final viscosity in the solid phase.

The final viscosity of the polyesters according to the invention should be in the range from 0.7 to 2.0 dl/g, preferably 0.7 to 1.5 dl/g, measured under the abovementioned conditions. The polycondensation time and the polycondensation temperature are regulated in a known manner such that the desired final viscosity is reached. As a rule, the polycondensation is carried out in the manner customary in the art of polyester preparation, depending on the nature of the polyester, at 260 to 350° C., preferably under an inert gas, for example under nitrogen, and/or under reduced pressure, which is in the range from 0.2 to 10 mbar, preferably 0.4 to 5 mbar.

To adjust certain polyester properties, such as, for example, the melt viscosity, it may be desirable to bring about a defined degree of crosslinking.

For this purpose, the polycondensation is carried out without addition of antimony in the presence of 2–8 ppm of titanium and in the presence of up to 1000 ppm, preferably 100 to 500 ppm, of organic compounds which donate crosslinking structural groups (crosslinking agents).

Crosslinking agents which are used are compounds which contain at least three functional groups which are capable of ester formation. Functional groups which are capable of ester formation are the OH group, the carboxyl group, alkoxycarbonyl, in particular lower alkoxycarbonyl, the carboxylic acid anhydride group and reactive groups which are derived from these. Examples of customary crosslinking agents are pentaerythritol, trimethylolpropane, trimellitic acid, trimesic acid, pyromellitic acid and the like.

To further improve the color shade of the polyester and to save some of the cobalt, it has proved expedient to carry out the polycondensation without addition of antimony in the presence of up to 50 ppm, preferably 5 to 25 ppm, of an optical brightener.

The chemical composition of the polyesters is of course of the greatest importance for their properties. To prepare polyesters which are suitable for the abovementioned intended uses, under the conditions mentioned above for the process according to the invention, 80 to 100 mol % of aromatic dicarboxylic acids of the formula III $$\text{HOOC—X—COOH} \quad (III)$$

or lower aliphatic esters thereof and 0 to 20 mol % of aromatic hydroxycarboxylic acids of the formula IV $$\text{HO—X}^1\text{—COOH} \quad (IV)$$

or lower aliphatic esters thereof, are esterified or transesterified with diols of the formula V $$\text{HO—Y—OH} \quad (V)$$

in which

X is, based on the total amount of di- and hydroxycarboxylic acids, aromatic radicals having 5 to 16, preferably 6 to 12 carbon atoms to the extent of more than 80 mol %, and not more than 20 mol % of aliphatic radicals having 4 to 10 carbon atoms, preferably 6 to 8 carbon atoms, $X^1$ is the p-phenylene radical, Y is, based on the total amount of transesterified or esterified diols, alkylene or polymethylene groups having 2 to 4 carbon atoms or cycloalkane or dimethylenecycloalkane groups having 6 to 10 carbon atoms to the extent of at least 80 mol % and straight-chain or branched alkanediyl having 4 to 16, preferably 4 to 8, carbon atoms or radicals of the formula —(C$_2$H$_4$—O)$_n$—C$_2$H$_4$—, in which n is an integer from 1 to 40, to the extent of not more than 20 mol %, where n is preferably 1 or 2 for contents up to 20 mol %, and groups where n=10 to 40 are preferably present only in contents of less than 5 mol %.

It is particularly preferable to choose the starting materials such that

X is, based on the total amount of di- and hydroxycarboxylic acids, p-phenylene radicals to the extent of 90 to 100 mol %, m-phenylene radicals to the extent of 0 to 7 mol % and aliphatic radicals having 4 to 10 carbon atoms, preferably 6 to 8 carbon atoms, to the extent of 0 to 5 mol %, $X^1$ is the p-phenylene radical, Y is, based on the total amount of transesterified or esterified diols, alkylene or polymethylene groups having 2 to 4 carbon atoms or cycloalkane or dimethylenecycloalkane groups having 6 to 10 carbon atoms to the extent of at least 90 mol % and straight-chain or branched alkanediyl having 4 to 16, preferably 4 to 8, carbon atoms or radicals of the formula —(C$_2$H$_4$—O)$_n$—C$_2$H$_4$—, in which n is the number 1 or 2, to the extent of not more than 10 mol %.

It is particularly preferable to employ no hydroxycarboxylic acid of the formula IV in the process according to the invention and to choose the dicarboxylic acid component of the formula III such that X is, based on the total amount of di- and hydroxycarboxylic acids, p-phenylene radicals to the extent of 93 to 99 mol %, preferably 95 to 98 mol %, and m-phenylene radicals to the extent of 1 to 7 mol %, preferably 2 to 5 mol %.

The aromatic radicals represented by X and $X^1$ can be unsubstituted or, if certain properties of the polyester are to be modified, carry one or two substituents.

Preferably, the radicals are mainly unsubstituted, i.e. not more than 10 mol % of the aromatic radicals carry substituents. The precise content of substituted radicals is specified according to the effect to be achieved.

Preferred possible substituents are the methyl group and the sulfonic acid group.

In addition to the abovementioned starting materials, up to 10 mol %, preferably up to 7 mol %, of other cocondensible compounds can be cocondensed into the polyester if certain specific properties are desired.

For example, polyesters of low flammability can be prepared by the process according to the invention if 1 to 10 mol %, based on all the cocondensed dicarboxylic acids and, where appropriate, hydroxycarboxylic acids, of the compounds known from DE-C-23 46 787 and 24 54 189, which donate polyester structural groups of the formula VI

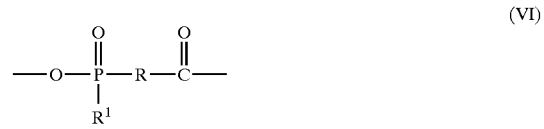

in which

R is a saturated open-chain or cyclic alkylene, arylene or aralkylene radical, preferably alkanediyl having 2 to 6 carbon atoms, cycloalkanediyl having 6 carbon atoms, methylenephenyl or phenylene, in particular ethylene, and $R^1$ is an alkyl radical having up to 6 carbon atoms or an aryl or aralkyl radical, preferably alkyl having 1 to 6 carbon atoms, or aryl or aralkyl having 6 to 7 carbon atoms, in particular methyl, ethyl, phenyl or benzyl, are cocondensed into the polyester.

Up to 10% by weight of modifying additives, fillers, pigments, dyestuffs, antioxidants, hydrolysis, light and heat stabilizers and/or processing auxiliaries can be added to the esterification, transesterification or polycondensation batches if these additives do not inhibit the titanium catalyst.

The addition of up to 10% by weight, preferably up to 5% by weight, of polyester stabilizers which protect the polyester content of the mixture against hydrolysis and thermal degradation is particularly preferred in the process according to the invention.

Particularly advantageous stabilizers are those compounds which can react with terminal carboxyl groups of the polyester to give non-acid end groups, such as, for example, glycidyl ethers, keteneimines, aziridines or isocyanates. Particularly advantageous stabilizers are carbodiimides and polycarbodiimides, specially if they are employed in combination with one another.

The present invention also relates to the polyesters which can be prepared by the process described above and are based on aromatic dicarboxylic acids and aliphatic diols, which are distinguished in that, in the non-matted state, their color number components are a* in the range from −3 to +3, preferably from −2 to +2, b* in the range from −6 to +6, preferably from −3.5 to +3.5, and L* in the range from 55 to 75, preferably 60 to 70.

The polyester according to the invention is furthermore distinguished in that it is free from antimony, and comprises 1 to 10 ppm of titanium (calculated as the metal), 20 to 120 ppm of a transesterification catalyst metal in the form of catalytically inactive complexes with phosphoric acid, phosphorous acid and/or phosphonic acids or a derivative thereof, and 0 to 80 ppm of cobalt (calculated as the metal), which is partly present in the form of catalytically inactive complexes with phosphoric acid, phosphorous acid and/or phosphonic acids or a derivative thereof, and optionally up to 50 ppm of an optical brightener.

Preferably, the polyester according to the invention is free from antimony and comprises 2 to 8 ppm of titanium (calculated as the metal), 50 to 90 ppm of manganese (calculated as the metal) in the form of catalytically inactive complexes with phosphoric acid, phosphorous acid and/or phosphonic acids or a derivative thereof, and 20 to 40 ppm of cobalt, which is partly in the form of catalytically inactive complexes with phosphoric acid, phosphorous acid and/or phosphonic acids or a derivative thereof, and optionally up to 25 ppm of an optical brightener.

It is furthermore preferable that 90 to 99% of the cobalt is in the form of catalytically inactive complexes with phosphoric acid, phosphorous acid and/or phosphonic acids or a derivative thereof and/or that it comprises 5 to 25 ppm of an optical brightener.

The catalytically inactive complexes of the transesterification catalyst, preferably of manganese, and of cobalt can in principle comprise all the complexing agents known for inactivation of these metals. The catalytically inactive complexes of the transesterification catalysts, in particular of manganese, and cobalt with phosphoric acid, polyphosphoric acid or, in particular, phosphorous acid or a derivative thereof, in particular an ester of these acids, are preferred.

The structure of the polyester chain is also of course of particular importance for all the technical features. Purely qualitatively, it may be said that it is built up from the structural groups customary in known fiber-forming polyesters.

They mainly, i.e. to the extent of at least 80 mol %, comprise units which are derived from aromatic dicarboxylic acids and from aliphatic diols. Customary aromatic dicarboxylic acid units are the divalent radicals of benzenedicarboxylic acids, in particular of terephthalic acid and of isophthalic acid; customary diols have 2–4 carbon atoms, ethylene glycol being particularly suitable. Modified polyesters preferably comprise at least 80 mol % of ethylene terephthalate units. The remaining 20 mol % are then built up from dicarboxylic acid units and glycol units, which act as so-called modifying agents and allow the expert to influence the physical and chemical properties of the products produced from the polyesters, such as, for example, filaments and packaging materials (for example drinks bottles), in a controlled manner. Examples of such dicarboxylic acid units are radicals of isophthalic acid or of aliphatic dicarboxylic acids, such as, for example, glutaric acid, adipic acid and sebacic acid; examples of diol radicals which have a modifying action are those of longer-chain diols, for example of propanediol or butanediol, of di- or triethylene glycol or, if present in a small amount, of polyglycol having a molecular weight of about 500–2000.

In detail, preferred polyesters according to the invention are those in which the polymer chains are built up from 80 to 100 mol % of structural groups of the formula VI

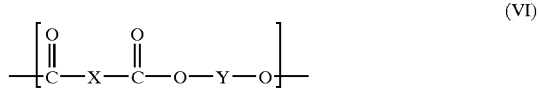

(VI)

and 20 to 0 mol % of structural groups of the formula VII

(VII)

in which

X is aromatic radicals having 5 to 16, preferably 6 to 12 carbon atoms to the extent of more than 80 mol % and not more than 20 mol % of aliphatic radicals having 4 to 10 carbon atoms, preferably 6 to 8 carbon atoms, $X^1$ is the p-phenylene radical, Y is alkylene or polymethylene groups having 2 to 4 carbon atoms or cycloalkane or dimethylene-cycloalkane groups having 6 to 10 carbon atoms to the extent of at least 80 mol % and straight-chain or branched alkanediyl having 4 to 16, preferably 4 to 8 carbon atoms or radicals of the formula —$(C_2H_4$—$O)_n$—$C_2H_4$—, in which n is an integer from 1 to 40, to the extent of not more than 20 mol %, where n is preferably 1 or 2 for contents up to 20 mol % and groups where n=10 to 40 are preferably present only in contents of less than 5 mol %.

Particularly preferred polyesters according to the invention are those which are composed of structural groups of the formula IV in which X is p-phenylene radicals to the extent of 90 to 100 mol %, m-phenylene radicals to the extent of 0 to 7 mol % and aliphatic radicals having 4 to 10 carbon atoms, preferably 6 to 8 carbon atoms, to the extent of 0 to 5 mol %, Y is alkylene or polymethylene groups having 2 to 4 carbon atoms or cycloalkane or dimethylenecycloalkane groups having 6 to 10 carbon atoms to the extent of at least 90 mol % and straight-chain or branched alkanediyl having 4 to 16, preferably 4 to 8 carbon atoms or radicals of the formula —$(C_2H_4—O)_n—C_2H_4$—, in which n is the number 1 or 2, to the extent of not more than 10 mol %.

Especially preferred polyesters according to the invention are those which are composed of structural groups of the formula IV in which X is p-phenylene radicals to the extent of 93 to 99 mol % and m-phenylene radicals to the extent of 1 to 7 mol %.

It is often expedient to establish a defined degree of crosslinking of the polyester. In these cases, it is preferable for the polyester to comprise up to 1000 ppm of the abovementioned crosslinking structural groups.

The polyesters according to th invention prepared by melt polycondensation expediently have an intrinsic viscosity (IV) of 0.600 to 0.900, measured in dichloroacetic acid at 25° C.

Polyesters which contain structural groups of the formula VII preferably contain 70 to 100 mol %, in particular 85 to 100 mol %, of structural groups of the formula VI and 0 to 30 mol %, in particular 0 to 15 mol %, of structural groups of the formula VII.

The aromatic radicals represented by X can all be identical, in the context of the definition given, or they can differ.

In particular, the abovementioned structural groups represented by X which form the polyester chain to the extent of at least 80 mol % can be present individually or as a mixture in the polyester chain. It is preferable if the minimum of 80 mol % of the polyester chain is formed by only one or two individuals from the group of radicals stated for these main components. Any further modification of the polyester chain which may be desired is then preferably effected by other structural groups in the context of the definition which has been given for the maximum of 20 mol % of structural groups present represented by X.

Thus, the minimum of 80% by weight of aromatic radicals can all be 1,4-phenylene radicals, for example, or they can be composed, for example, in a molar ratio of 95:5 to 99:1 of 1,4- and 1,3-phenylene radicals or in a molar ratio of 4:6 to 6:4 of 2,6-naphthylene radicals and biphenyl-4,4'-diyl radicals. Preferred polyesters are those in which X is at least 95 mol % of aromatic radicals and not more than 5 mol % of aliphatic radicals, especially those in which X is exclusively aromatic radicals.

The radicals represented by Y can also all be the same, in the context of the definition given, or they can be different. In particular, the abovementioned structural groups represented by Y which form the polyester chain to the extent of at least 80 mol % can be present individually or as a mixture in the polyester chain. It is preferable if the minimum of 80 mol % of the polyester chain is formed by only one or two individuals from the group of radicals stated for this main component. Any further modification of the polyester chain which may be desired is then preferably effected by other structural groups in the context of the definition which has been given for the maximum of 20 mol % of structural groups present represented by Y. Thus, the minimum of 80% by weight of aliphatic radicals can all be ethylene radicals, for example, or they can be composed, for example, in a molar ratio of 10:1 to 1:10 of ethylene and 1,4-dimethylene-cyclohexane radicals.

Polyesters in which Y is at least 95 mol % of ethylene radicals are particularly preferred.

Preferred aromatic radicals represented by X are 1,4- and 1,3-phenylene. However, 1,4-, 1,5-, 1,8-, 2,6- and 2,7-naphthylene, 4,4'-biphenylene, furylene and radicals of the formula VI

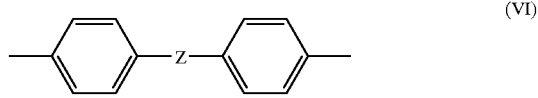

(VI)

in which Z is polymethylene or alkylene having 1 to 4 carbon atoms, —$SO_2$—, —COO—, —O— or —S—, are also suitable radicals.

The aromatic radicals represented by X can in turn also carry one or two substituents. In this case, however, it is preferable for only a content of up to 15%, in particular of up to 7%, of the aromatic radicals present to be substituted. Preferably, the substituted aromatic radicals in each case carry only one substituent. Particularly suitable substituents are alkyl having 1 to 4 carbon atoms, alkoxy having 1 to 4 carbon atoms, chlorine and the sulfo group.

Radicals which are derived from aliphatic dicarboxylic acids and aromatic radicals which provide angled chains, for example isophthalic acid radicals, or contain bulkier aromatic nuclei, such as the naphthalene nucleus, and the longer-chain structural groups represented by Y are incorporated into the polyester chain in particular if modification of the properties of the polyester is desired. Polyesters which contain less than 7% of these components having a modifying action are preferred.

To achieve specific use properties, for example, units containing sulfo groups (for example sulfo-isophthalic acid) are incorporated into the polyester, which thereby acquires an affinity for basic dyestuffs, or structural groups of the abovementioned formula VI are incorporated, leading to polyesters of low flammability.

EXAMPLE 1a

A transesterification reactor is charged with 9.75 kg of dimethyl terephthalate, 0.25 kg of dimethyl isophthalate, 6 kg of ethylene glycol and 3 g of manganese acetate.$4H_2O$ (68 ppm of manganese based on the polyester), and the mixture is heated to 140° C., while stirring and under nitrogen as an inert gas. The reaction temperature is increased to 230° C. in the course of 4 hours and the methanol which has been split off and the excess ethylene glycol are distilled off.

The molten reaction product in then transferred into a polycondensation vessel, 1.65 g (165 ppm) of $H_3PO_3$, as a complexing agent, and 1.27 g (127 ppm) of cobalt acetate (corresponding to 30 ppm of Co) are added and the mixture is stirred at 230° C. for 10 to 15 minutes.

Thereafter, 0.27 g (27 ppm) of potassium titanyloxalate (corresponding to 3.6 ppm of Ti) is added and the batch is stirred under nitrogen at 240° C., ethylene glycol being distilled off under a slight vacuum.

The internal pressure is then lowered to 1.13 mbar in the course of one hour, during which the temperature of the melt is increased from 240 to 270° C. The temperature is then increased to 280° C. in the course of a further half an hour, and stirring is continued until a sample of the melt has a specific solution viscosity, measured in a solution of 1 g of the melt in 100 ml of dichloroacetic acid at 25° C., of 0.83.

Alternatively, and more conveniently, the polycondensation can also be continued to a certain melt viscosity if the melt viscosity at 280° C. which corresponds to the solution viscosity of 0.83 has been determined in preliminary experiments.

The melt is cooled and processed to pellets having a diameter of 2 to 3 mm in the customary manner. The polyester thus obtained has the following characteristic values:

Content of carboxyl groups [mmol/kg]: 12

Content of diethylene glycol [%]: 0.5

Color numbers: L*=63.44; a*=−0.62; b*=3.09

The polyester thus prepared can be condensed even further by solid phase condensation.

For this purpose, the pellets prepared above are heated for 17 hours at 220° C. in the customary manner in vacuo or under nitrogen, with slow thorough mixing. A polyester having a specific viscosity, measured as above, of 1.014 is thus obtained.

EXAMPLES 1b to 1l

The above example was repeated several times in the discontinuous manner described in Example 1a (Examples 1j to 1l) or analogously under continuous operation (Examples 1b to 1i), the amount of added cobalt, the nature and amount of the complexing agent and the nature and amount of the titanium catalyst being modified, and in some cases a commercial optical brightener (®HOSTALUX KS from Hoechst AG) or a crosslinking agent (pentaerythritol) was additionally added. The polycondensation in the melt was carried out under various pressures and with various reaction times, and the duration and temperature of the condensation were varied for the solid phase condensation.

The composition of the batches and the reaction conditions, where these have been varied, the color numbers, as well as the specific viscosity reached and the content of carboxylic acid groups and diglycol in the polyesters have been stated in the following Tables 1 and 2.

The abbreviations used in the Tables have the following meanings:

KTi=potassium titanyloxalate; Tiip=isopropyl titanate $Co(AcO)_2 \cdot 4H_2O$=cobalt acetate tetrahydrate $PO_3$=phosphorous acid; $PO_4$=phosphoric acid;

PPA=polyphosphoric acid; PHM=PHM ester

HLX=®HOSTALUX KS; Penta=pentaerythritol

SV=specific viscosity;

[COOH] carboxyl end group concentration; DEG= concentration of diethylene glcyol.

All the ppm data relate to the amount of polyester theoretically to be obtained with the batch. If the compound added is a metal compound (for example a catalyst), the compound abbreviation means that the ppm data designate the amount of the compound, and if the metal symbol is given, the ppm data are the amount of metal contained in the compound added.

TABLE 1

| Example No. | Polycondensation catalyst Nature | Amount [ppm] | Cobalt compound Nature | Amount [ppm] total | Amount [%] free | Complexing agent Nature | Amount [ppm] total | Further additives Nature | Amount [ppm] |
|---|---|---|---|---|---|---|---|---|---|
| 1b | KTi | 27 | $Co(Ac)_2$ | 84 | 0 | PO3 | 150 | — | — |
| 1c | KTi | 27 | $Co(Ac)_2$ | 84 | 0 | PO3 | 150 | HLUX | 10 |
| 1d | KTi | 27 | $Co(Ac)_2$ | 127 | 0 | PO3 | 165 | HLUX | 10 |
| 1e | KTi | 27 | $Co(Ac)_2$ | 127 | 0 | PO3 | 165 | Penta | 200 |
| 1f | KTi | 54 | $Co(Ac)_2$ | 127 | 0 | PO3 | 165 | — | — |
| 1g | KTi | 54 | $Co(Ac)_2$ | 169 | 0 | PO3 | 189 | — | — |
| 1h | KTi | 27 | $Co(Ac)_2$ | 127 | 100 | PO3 | 121 | — | — |
| 1i | $Sb_2O_3$ | 395 | — | — | — | PO3 | 121 | — | — |
| 1j | KTi | 45 | $Co(Ac)_2$ | 135 | 10 | PO3 | 140 | Penta | 200 |
| 1k | KTi | 27 | $Co(Ac)_2$ | 127 | 100 | PO3 | 121 | — | — |
| 1l | $Sb_2O_3$ | 390 | — | — | — | PO3 | — | — | — |

TABLE 2

| Example No. | Melt condensation Pressure [mbar] | Duration [min] | SV | [COOH] [mmol/kg] | DEG [%] | Color numbers L* | a* | b* | Solid phase condensation Duration [h] | Temp. [° C.] | SV |
|---|---|---|---|---|---|---|---|---|---|---|---|
| 1b | 1.1 | — | 0.851 | 11 | 0.47 | 65.76 | −1.19 | 5.89 | 14 | 220 | 1.048 |
| 1c | 0.9 | — | 0.835 | 15 | 0.48 | 66.57 | −0.62 | 4.07 | 16 | 220 | 1.057 |
| 1d | 0.8 | — | 0.835 | 13 | 0.48 | 64.95 | 0.12 | 0.98 | 18.5 | 220 | 1.019 |
| 1e | 1.1 | — | 0.826 | 10 | 0.53 | 67.30 | 0.12 | 0.77 | 14 | 220 | 1.032 |
| 1f | 1.6 | — | 0.848 | 12 | 0.55 | 66.19 | −0.94 | 4.92 | 10.5 | 220 | 1.063 |
| 1g | 1.0 | — | 0.840 | 12 | 0.50 | 64.37 | 0.27 | −0.11 | 16 | 220 | 1.000 |
| 1h | 1.3 | — | 0.846 | 17 | 0.53 | 66.28 | −0.03 | 2.34 | 14 | 220 | 1.055 |
| 1i | 1.6 | — | 0.829 | 13 | 0.55 | 64.07 | −2.31 | 7.27 | 9.25 | 220 | 1.038 |
| 1j | 0.8 | 141 | 0.832 | 15 | 0.74 | 62.75 | 0.86 | 2.65 | 12 | 225 | 1.048 |
| 1k | 0.8 | 189 | 0.853 | 9 | 0.72 | 66.35 | −0.30 | −0.19 | 12 | 220 | 1.134 |
| 1l | 0.8 | 184 | 0.834 | 11 | 0.63 | 64.64 | −2.51 | 4.16 | 12 | 225 | 1.053 |

EXAMPLE 2

The following embodiment example illustrates the preparation of a polyester by direct esterification:

An esterification reactor is charged with 8.29 kg of terephthalic acid, 0.124 kg of isophthalic acid and 4.0 kg of ethylene glycol and the mixture is heated under a pressure of 3.2 bar, while stirring and under nitrogen as an inert gas, such that the water eliminated is distilled off.

When the elimination of water has ended, the molten reaction product is transferred to a polycondensation vessel, and 0.35 g (32 ppm) of $H_3PO_3$, as a complexing agent, and 1.47 g (135 ppm) of cobalt acetate tetrahydrate (corresponding to 32 ppm of Co) are added.

Thereafter, 0.49 g (45 ppm) of potassium titanyloxalate (corresponding to 6.1 ppm of Ti) are added and the batch is stirred under nitrogen at 240° C., ethylene glycol being distilled off under a slight vacuum.

The internal pressure is then lowered to 1.13 mbar in the course of one hour, during which the temperature of the melt is increased from 240 to 270° C. The temperature is then increased to 280° C. in the course of a further half an hour, and stirring is continued until a sample of the melt has a specific solution viscosity, measured in a solution of 1 g of the melt in 100 ml of dichloroacetic acid at 25° C, of 0.83.

The melt is cooled and processed to pellets having a diameter of 2 to 3 mm in the customary manner. The polyester thus obtained has the following characteristic values:

Content of carboxyl groups [mmol/kg]: 13

Content of diethylene glycol [%]: 1.19

Color numbers: L*=63.6; a*=1.90; b*=−1.5

The polyester thus prepared can be condensed even further by solid phase condensation.

For this, the pellets prepared above are heated at 220° C. under nitrogen or in vacuo for 9.5 hours, with slow thorough mixing. A polyester having a specific viscosity, measured as above, of 1.087 is thus obtained.

Further polyesters can be prepared in an analogous manner under the conditions which can be seen from Tables 3 and 4. The products have the features which can be seen from Table 4.

What is claimed is:

1. A process for the preparation of a heat-stable antimony free polyester of neutral color comprising the esterification of an aromatic dicarboxylic acid or transesterification of a lower alkyl ester of an aromatic dicarboxylic acid with an aliphatic diol in the presence of 20 to 120 ppm of a transesterification metal catalyst, which is added in the form of a metal compound, and subsequent polycondensation, wherein after the esterification or transesterification has ended, a complexing agent selected from the group consisting of phosphoric acid, phosphorous acid, phosphonic acid and the esters of such acids is added in an amount which is 100% of the amount equivalent to the transesterification catalyst employed and up to 99% of the amount equivalent to cobalt to be employed, and wherein between 1 and 80 ppm of the cobalt in the form of a cobalt compound is added, and the polycondensation is carried out without the addition of antimony, in the presence of 1 to 10 ppm of titanium, which is added in the form of a titanium compound.

2. The process as claimed in claim 1, wherein, the complexing agent is added to the esterification or transesterification batch in an amount of 100% of the amount equivalent to the transesterification catalyst employed and 90 to 99% of the amount equivalent to the cobalt to be employed.

3. The process as claimed in claim 1, wherein a melt is formed during the polycondensation which is carried out in the presence of 1 to 10 ppm of titanium up to an intrinsic viscosity, measured in dichloroacetic acid at 25° C., of 0.4 to 0.9 dl/g and up to a carboxyl group concentration of 10 to 50 mmol/kg in the melt, and then wherein the polycondensation is continued up to the desired end viscosity in the solid phase.

4. The process as claimed in claim 1, wherein 20 to 40 ppm of cobalt in the form of a cobalt compound is added to the batch.

5. The process as claimed in claim 1, wherein the polycondensation is carried out in the presence of 2–8 ppm of titanium.

6. The process claimed in claim 1, wherein the polycondensation is carried out in the presence of 100 to 500 ppm of organic crosslinking agents.

TABLE 3

| Example No. | Polycondensation catalyst Nature | Polycondensation catalyst Amount [ppm] | Cobalt compound Nature | Cobalt compound Amount [ppm] | Cobalt compound % free | Complexing agent Nature | Complexing agent Amount [ppm] | Additives Nature | Additives Amount [ppm] |
|---|---|---|---|---|---|---|---|---|---|
| 2b | $Sb_2O_3$ | 298 | — | — | — | $H_3PO_3$ | 32 | Penta | 200 |
| 2c | KTi | 45 | $Co(Ac)_2$ | 84 | 100 | — | — | Penta | 200 |
| 2d | KTi | 45 | $Co(Ac)_2$ | 135 | 25 | $H_3PO_3$ | 32 | Penta | 200 |

TABLE 4

| Example No. | Melt condensation pressure [mbar] | SV | [COOH] [mmol/kg] | DEG [%] | Color numbers L* | Color numbers a* | Color numbers b* |
|---|---|---|---|---|---|---|---|
| 2b | 2.75 | 0.812 | 20 | 1.51 | 62.8 | −1.8 | 5.2 |
| 2c | 4.7 | 0.814 | 21 | 1.49 | 63.6 | 0.5 | 4.7 |
| 2d | 2.35 | 0.823 | 12 | 1.36 | 64.6 | 1.7 | 0.9 |

7. The process as claimed in claim 1, wherein the polycondensation is carried out in the presence of up to 25 ppm of an optical brightener.

8. A heat-stable, antimony-free polyester of neutral color based on an aromatic dicarboxylic acid and an aliphatic diol, prepared by the process as claimed in claim 1, in which, in the non-matted state, its color number components are a* in the range from −3 to +3, b* in the range from −6 to +6 and L* in the range from 55 to 75.

9. A heat-stable, antimony-free polyester of neutral color based on an aromatic dicarboxylic acid and an aliphatic diol as claimed in claim 8, which comprises 1 to 10 ppm of titanium, 20 to 120 ppm of a transesterification catalyst metal in the form of catalytically inactive complexes with a complexing agent selected from the group consisting of phosphoric acid, phosphorous acid, phosphonic acid and the esters of such acids, and 0 to 80 ppm of cobalt, which is partly present in the form of catalytically inactive complexes with a complexing agent selected from the group consisting of phosphoric acid, phosphorous acid, phosphonic acid and derivatives thereof.

10. A heat-stable, antimony-free polyester of neutral color as claimed in claim 8, which comprises 2 to 8 ppm of titanium, 50 to 90 ppm of manganese in the form of catalytically inactive complexes with a complexing agent selected from the group consisting of phosphoric acid, phosphorous acid, phosphonic acid and the esters of such acids, and 20 to 40 ppm of cobalt, which is partly present in the form of catalytically inactive complexes with a complexing agent selected from the group consisting of phosphoric acid, phosphorous acid, phosphonic acid and derivatives thereof.

11. A heat-stabled, antimony-free polyester of neutral color as claimed in claim 8, in which, in the non-matted state, its color number components are a* in the range from −2 to +2, b* in the range from −3.5 to +3.5 and L* in the range from 60 to 70.

12. A heat-stable, antimony-free polyester of neutral color as claimed in claim 8, in which 90 to 99% of the cobalt is in the form of one or more catalytically inactive complexes with a complexing agent selected from the group consisting of phosphoric acid, phosphorous acid, phosphonic acid and the esters of such acids.

13. A heat stable, antimony-free polyester of neutral color as claimed in claim 8, which comprises 5 to 25 ppm of an optical brightener.

14. A heat-stable, antimony-free polyester of neutral color as claimed in claim 8, in which the catalytically inactive complexes of manganese and of cobalt are complexes with phosphorous acid or an ester thereof.

15. A heat-stable, antimony-free polyester of neutral color as claimed in claim 8, which further comprises up to 1000 ppm of crosslinking structural groups.

16. The process as claimed in claim 1, wherein the transesterification catalyst is manganese in the form of a manganese compound.

17. The process as claimed in claim 1, wherein the polycondensation is carried out in the presence of up to 1000 ppm of organic crosslinking agents.

18. The process as claimed in claim 1, wherein the polycondensation is carried out in the presence of up to 50 ppm of an optical brightener.

19. The process as claimed in claim 3, wherein the end viscosity of the heat-stable antimony-free polyester is 0.7 to 2.0 dl/g, measured in dichloroacetic acid at 25° C.

20. A heat-stable, antimony-free polyester of neutral color as claimed in claim 9, which further comprises up to 50 ppm of an optical brightener.

21. A heat-stable, antimony-free polyester of neutral color as claimed in claim 10, which further comprises up to 25 ppm of an optical brightener.

22. The process as claimed in claim 1, wherein the titanium compound is potassium titanyloxalate.

* * * * *